United States Patent
Linn et al.

(10) Patent No.: US 10,768,586 B2
(45) Date of Patent: Sep. 8, 2020

(54) SYSTEM AND METHOD FOR BACKGROUND ELEMENT SWITCHING FOR MODELS IN MODEL PREDICTIVE ESTIMATION AND CONTROL APPLICATIONS

(71) Applicant: SHELL OIL COMPANY, Houston, TX (US)

(72) Inventors: Richard Eugene Linn, Sugar Land, TX (US); Pierre Christian Marie Carrette, Seria (BN); John Martin Williamson, Houston, TX (US); Rishi Amrit, Katy, TX (US); Jean Valiquette, Houston, TX (US)

(73) Assignee: Shell Oil Company, Houston, TX (US)

( * ) Notice: Subject to any disclaimer, the term of this patent is extended or adjusted under 35 U.S.C. 154(b) by 101 days.

(21) Appl. No.: 15/578,051

(22) PCT Filed: Jun. 2, 2016

(86) PCT No.: PCT/US2016/035446
§ 371 (c)(1),
(2) Date: Nov. 29, 2017

(87) PCT Pub. No.: WO2016/196746
PCT Pub. Date: Dec. 8, 2016

(65) Prior Publication Data
US 2018/0136618 A1    May 17, 2018

Related U.S. Application Data

(60) Provisional application No. 62/171,591, filed on Jun. 5, 2015.

(51) Int. Cl.
G05B 13/04    (2006.01)

(52) U.S. Cl.
CPC .................... *G05B 13/048* (2013.01)

(58) Field of Classification Search
CPC ..................................... G05B 13/048
(Continued)

(56) References Cited

U.S. PATENT DOCUMENTS

| 6,272,882 B1 | 8/2001 | Hodges et al. |
| 6,373,033 B1 * | 4/2002 | de Waard ............. G05B 13/048 |
| | | 219/497 |

(Continued)

OTHER PUBLICATIONS

Computers and Chemical Engineering: "Nonlinear modeling, estimation and predictive control in APMonitor". John D. Hedengrena, Reza Asgharzadeh Shishavan, Kody M. Powell, Thomas F. Edgar. Computers and Chemical Engineering 70 (2014) 133-148.*

(Continued)

*Primary Examiner* — Francisco J Aponte
(74) *Attorney, Agent, or Firm* — James D. Carruth

(57) ABSTRACT

It is advantageous to switch an active element with a background element. By using a switching mechanism, a background element can be made active while the application remains active. That is, the application does not need to be taken offline to switch the active element with a previously loaded background element. Single input/single output (SISO) relationships are defined for background elements and an active element which provides one or many functions and an active element which provides one or many functions between one input variable and one output variable. The switching mechanism acts on a given SISO relationship to determine the background element to use to replace the active element.

13 Claims, 3 Drawing Sheets

(58) Field of Classification Search
USPC .......................................................... 700/31
See application file for complete search history.

(56) References Cited

U.S. PATENT DOCUMENTS

| | | | |
|---|---|---|---|
| 6,504,885 B1* | 1/2003 | Chen ........................ | H04B 1/30 375/325 |
| 6,826,521 B1 | 11/2004 | Hess et al. | |
| 7,187,990 B2* | 3/2007 | Jang ..................... | G05B 13/027 700/31 |
| 7,203,554 B2* | 4/2007 | Fuller ................... | G05B 13/048 700/121 |
| 7,203,555 B2* | 4/2007 | Ogunnaike .............. | G05B 5/01 700/28 |
| 7,317,953 B2* | 1/2008 | Wojsznis ............... | G05B 11/32 700/28 |
| 7,400,933 B2* | 7/2008 | Rawlings ............. | G05B 13/048 700/28 |
| 7,447,664 B2* | 11/2008 | Pado .................... | G05B 13/027 706/15 |
| 7,515,975 B2* | 4/2009 | Stewart .................... | G05B 5/01 307/139 |
| 7,778,806 B2* | 8/2010 | Ishikawa ................ | G05B 17/02 703/2 |
| 7,818,276 B2* | 10/2010 | Veillette ............. | G05B 23/0245 700/29 |
| 7,881,815 B2* | 2/2011 | Srinivasan ............ | G05B 17/02 700/28 |
| 8,055,358 B2* | 11/2011 | Blevins ................ | G05B 13/022 700/28 |
| 8,195,581 B2* | 6/2012 | Backstrom .......... | G06F 17/5009 700/128 |
| 8,295,951 B2* | 10/2012 | Crisalle ................ | G05B 13/048 700/29 |
| 8,527,252 B2* | 9/2013 | Kephart ........... | G05B 19/41885 703/13 |
| 9,163,828 B2* | 10/2015 | Beveridge ............... | F01K 13/02 |
| 9,280,146 B2* | 3/2016 | Gahinet ............... | G05B 13/047 |
| 9,765,621 B2* | 9/2017 | Huang ................ | F02D 41/1406 |
| 10,281,897 B2* | 5/2019 | Di Cairano .......... | G05B 19/106 |
| 10,310,456 B2* | 6/2019 | Caldwell ............. | G05B 13/048 |
| 2003/0195665 A1 | 10/2003 | Cutler | |
| 2005/0107895 A1* | 5/2005 | Pistikopoulos ...... | G05B 13/048 700/52 |
| 2005/0149209 A1 | 7/2005 | Wojsznis et al. | |
| 2007/0078529 A1 | 4/2007 | Thiele et al. | |
| 2011/0130850 A1 | 6/2011 | Zheng et al. | |
| 2012/0323342 A1* | 12/2012 | MacArthur ............ | G05B 17/02 700/29 |
| 2013/0030554 A1 | 1/2013 | Macarthur et al. | |
| 2013/0197677 A1* | 8/2013 | Gahinet ............... | G05B 13/021 700/33 |
| 2014/0067197 A1* | 3/2014 | Stadlbauer ........... | G05B 13/042 701/32.8 |

OTHER PUBLICATIONS

Yajun Zhang et al.: "A Nonlinear Control Method Based on ANFIS and Multiple Models for a Class of SISO Nonlinear Systems and Its Application"; IEEE Transactions on Neural Networks, vol. 22, No. 11, Nov. 2011.*

International Search Report and Written Opinion for PCT Patent Application No. PCT/US2016/035446, dated Sep. 1, 2016, 6 pages.

Zhu et al., "Development and Application of an Integrated MPC Technology", Proceedings of the 17th World Congress the International Federation of Automatic Control, vol. 41, Issue No. 2, Jul. 6-11, 2008, pp. 6962-6967, XP002786578.

* cited by examiner

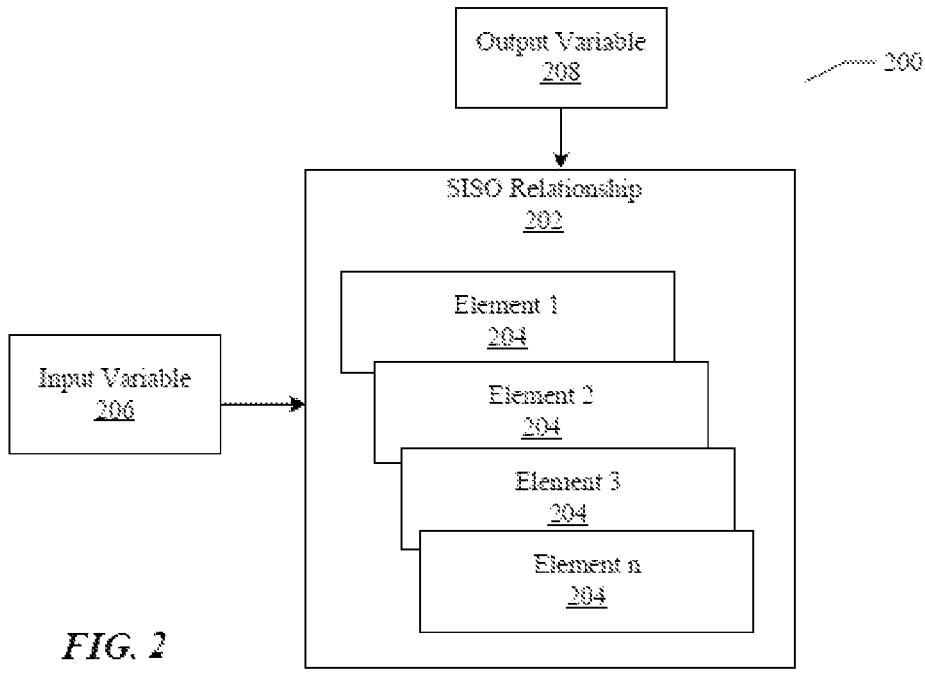
FIG. 2
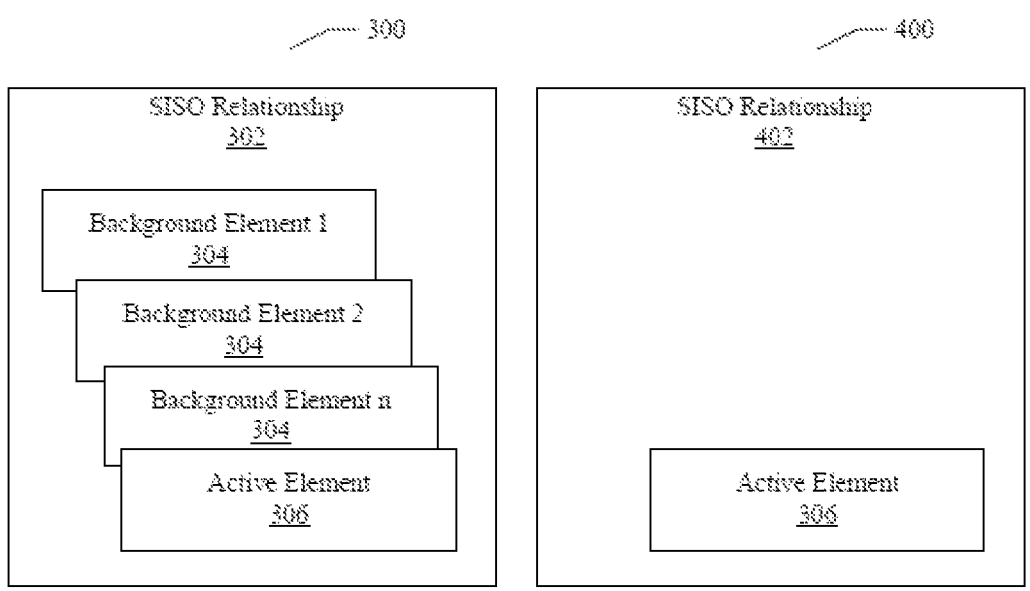
FIG. 3
FIG. 4

SYSTEM AND METHOD FOR BACKGROUND ELEMENT SWITCHING FOR MODELS IN MODEL PREDICTIVE ESTIMATION AND CONTROL APPLICATIONS

PRIORITY CLAIM

The present application is the National Stage (§ 371) of International Application No. PCT/US2016/035446, filed Jun. 2, 2016, which claims priority from U.S. Patent Application No. 62/171,591, filed Jun. 5, 2015 incorporated herein by reference.

TECHNICAL FIELD

The present disclosure relates generally to providing flexibility in changing the individual models on the control or estimation layer of a model predictive estimation or control application.

BACKGROUND

The present invention relates to background element switching for models in model predictive estimation or control applications and particularly to allowing flexibility in changing the individual models of the model predictive estimation or control application online while maintaining the future prediction of the process as opposed to taking the application offline to make a model change. For example, individual models may be changed in the control or estimation layer of the model. The present invention may be used in a petrochemical process, for example, the process of liquefying a gaseous, methane-rich feed to obtain a liquefied product. The liquefied product is commonly called liquefied natural gas. In particular the present invention relates to using model predictive controllers for controlling the liquefaction process.

The liquefaction process includes the steps of:
(a) supplying the gaseous, methane-rich feed at elevated pressure to a first tube side of a main heat exchanger at its warm end, cooling, liquefying and sub-cooling the gaseous, methane-rich feed against evaporating refrigerant to get a liquefied stream, removing the liquefied stream from the main heat exchanger at its cold end and passing the liquefied stream to storage as liquefied product;
(b) removing evaporated refrigerant from the shell side of the main heat exchanger at its warm end;
(c) compressing in at least one refrigerant compressor the evaporated refrigerant to get high-pressure refrigerant;
(d) partly condensing the high-pressure refrigerant and separating in a separator the partly-condensed refrigerant into a liquid heavy refrigerant fraction and a gaseous light refrigerant fraction;
(e) sub-cooling the heavy refrigerant fraction in a second tube side of the main heat exchanger to get a sub-cooled heavy refrigerant stream, introducing the heavy refrigerant stream at reduced pressure into the shell side of the main heat exchanger at its mid-point, and allowing the heavy refrigerant stream to evaporate in the shell side; and
(f) cooling, liquefying and sub-cooling at least part of the light refrigerant fraction in a third tube side of the main heat exchanger to get a sub-cooled light refrigerant stream, introducing the light refrigerant stream at reduced pressure into the shell side of the main heat exchanger at its cold end, and allowing the light refrigerant stream to evaporate in the shell side.

International patent application publication No. 99/31448 discloses controlling a liquefaction process by an advanced process controller based on model predictive control to determine simultaneous control actions for a set of manipulated variables in order to optimize at least one of a set of parameters whilst controlling at least one of a set of controlled variables. The set of manipulated variables includes the mass flow rate of the heavy refrigerant fraction, the mass flow rate of the light refrigerant fraction and the mass flow rate of the methane-rich feed. The set of controlled variables includes the temperature difference at the warm end of the main heat exchanger and the temperature difference at the mid-point of the main heat exchanger. The set of variables to be optimized includes the production of liquefied product. The process was considered to be advantageous because the bulk composition of the mixed refrigerant was not manipulated to optimize the production of liquefied product. However, Applicants have now found that the production of the liquefied product is not maximized when the application must be taken offline.

Traditionally model predictive estimators or controllers use linear dynamic models to predict the future of output variables from changes in input variables. These models may be composed of a set of selected single-input/single-output (SISO) relationships. Each of these SISO relationships would be represented by a linear function. However, most processes or systems to which estimators or controllers are applied are nonlinear. The linear model works well over a certain range of operation, but performance can degrade when process conditions change significantly such that the linear model no longer matches the process very well. Traditionally, this problem was addressed by identifying new functions for one or more SISO relationships and then taking the application offline and replacing the SISO relationships with the new functions. Such approach required manual intervention which required costly downtime of the system. When the controller or estimator was re-activated after such a model change, it suffered temporarily from poor performance because of the loss of the future prediction. Also, the process suffered from poor performance while the new relationships were identified and replaced. Thus, the traditional approach was costly and suffered from user errors and poor performance.

SUMMARY

In accordance with the present disclosure, a system and method is herein disclosed for creating a process model that provides for a switching mechanism for a multiple single input/single output (SISO) relationship.

The method disclosed herein is technically advantageous because a method is provided for implementation of background element switching for models in model prediction estimation or control applications. A model may be created from knowledge of a particular system to be modeled. A model may be structured according to established relationships between input and output variables and subsequently providing a transfer function form and parameters. This relationship between one input and one output variable is described by a single input/single output (SISO) relationship. A SISO relationship may contain one or more elements where an element is a static or dynamic function describing the influence one input has on one output. Blocks associate SISO relationships to organize specialized models while layers combine blocks to provide a multivariable representation used for control or estimation. A model structure provides the functionality required for estimation and control.

In one embodiment a process model is defined for an application. The process model for a particular embodiment may be a parameter model. The process model comprises one or more single-input/single-output (SISO) relationships. The one or more SISO relationships may comprise one or more background elements and an active element. The application is placed online such that it can be run in real-time as an active application. The application is run. In one embodiment the application runs for at least one cycle of estimation or control functionality using the associated process model prior to the determination step. A determination is made whether a selected background, chosen from one of the one or more background elements, element should be switched for the active element. In one embodiment, the determination step is based, at least in part, on one or more of one or more external characterizations, operator or user intervention, mode change, and input variable value. In one embodiment, the determination step is based, at least in part, on whether process conditions have changed such that the selected background element provides a better representation of the process model than the active element.

The selected background element may be copied as the new active element such that the selected background element replaces the active element as the new active element. In one embodiment, one or more states associated with the process model are adjusted based, at least in part, on one or more parameters of the new active element. The process model may include one or more states, for example, design, staged, live and archived. The design state may only exist in a design time workspace and both structure and attributes of the application of the process model in this state are modifiable. The staged state exists in the run time workspace and may be set to off or stand-by. When in stand-by data may be read in real-time but data will not be overwritten. Attributes of the application are modifiable but not the structure. The run time workspace may have zero or more versions of an application in the staged state. The live state exists in the run time workspace and may be set to off, stand-by (may read data from a real-time database but does not export data) or control (running and data is exportable). The application may be scheduled in the live state to run online or be the active application. The run time workspace may have zero or one version of the application in live state. The archived state exists both in the design time workspace and the run time workspace. Multiple version of an application may exist in this state.

In one embodiment, a range of a flowrate for a process stream is defined. The process stream is broken into a plurality of contiguous segments. Each background element is associated with a corresponding one of the contiguous segments. The determination of whether to switch the background element for the active element is then based, at least in part, on changes in flowrate from one contiguous segment to another contiguous segment such that the corresponding background element is switched for the active element each time the flowrate changes between contiguous segments. In another embodiment, the determination may be based, at least in part, on the feed type to a process unit where the feed type is associated with at least one of the one or more background elements.

Also, in another embodiment, a prediction of an effect of any one or more changes in an input variable on a respective output variable is made by utilizing the selected background element (the new active element) that replaced the active element. In another embodiment, the prediction of the previous embodiment is maintained so that the transition is bumpless or seamless.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a SISO relationship according to one or more embodiments of the present disclosure;

FIG. 3 illustrates a SISO relationship according to one or more embodiments of the present disclosure;

FIG. 4 illustrates a SISO relationship according to one or more embodiments of the present disclosure;

Figure 1:
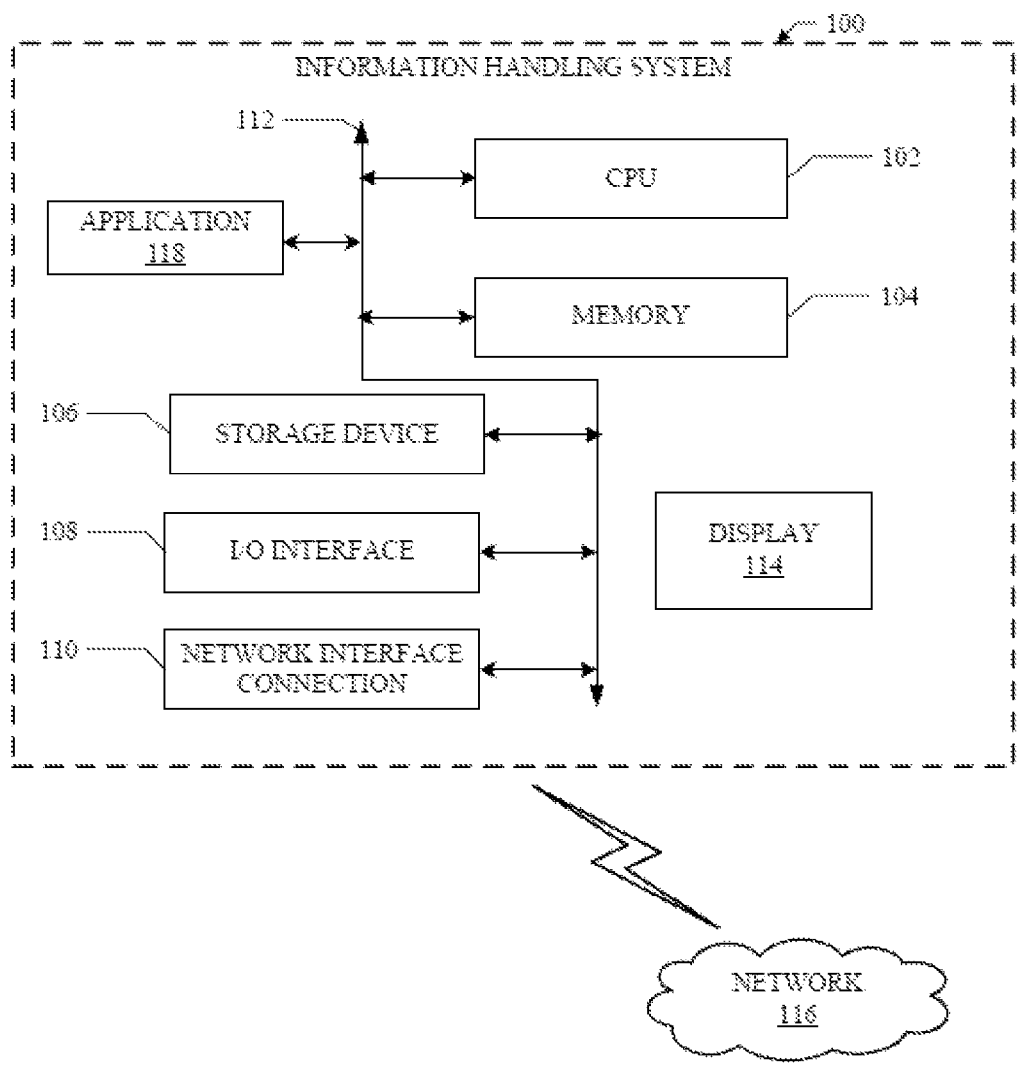
FIG. 1 shows an example information handling system according to one or more embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

An estimation or control application may replace active elements of a model with background elements using a switching mechanism that does not require taking the controller offline. For example, an estimation or control application may be used in a petrochemical process. For example, the process of liquefying a gaseous, methane-rich feed of the invention to obtain a liquefied product may include utilizing such a controller. A controller refers to a multivariable model-based predictive control (MPC) application designed to perform advanced process control (APC). A processor incorporates many functions, including I/O communications, variable and measurement validation, estimation and prediction, steady-state optimization, and control move calculation. Estimators and controllers are examples of processors. An application may have one or more processors which may be sequenced in execution and have parameters which interface to one another or external to the application.

A controller is associated with a process model, which itself contains a list of input and output variables, and also includes sub-systems, variable sets, economic functions, and tuning and other design and configuration information. The lists of variables for a controller and its model must be consistent (for example, when a variable is added or removed from the controller, it is also automatically added or removed from the model). Variables in a model are classified as either model inputs or as model outputs. This classification is for modeling purposes only (for example, the mathematics of using measured inputs to produce estimates of process values) and does not necessarily structurally correspond to the physical arrangement of the process being modeled. A significant portion of the design process for a controller involves selection of the input and output variables, and development of the model.

Referring now to the drawings, the details of specific example embodiments are schematically illustrated. Like components in the drawings will be represented by like numbers, and similar components will be represented by like numbers with a different lower case letter suffix.

For one or more embodiments of the present invention, an information handling system may be utilized to implement one or more embodiments. Such embodiments may be implemented on virtually any type of information handling system regardless of the platform being used. Such information handling system hardware used to implement one or more of the embodiments described herein may include a processor configured to execute one or more sequences of instructions, programming stances, or code stored on a non-transitory, computer-readable medium. For example, as shown in FIG. 1, an information handling system 100 includes one or more central processing units (CPU) 102, associated memory 104 (for example, random access memory (RAM), read-only memory (ROM), cache memory, flash memory, etc.), a storage device 106 (for example, a hard disk, solid state memory, an optical drive such as a compact disk drive or digital video disk (DVD) drive, a flash memory stick, etc.), and numerous other elements and functionalities typical of today's computers (not shown). The CPU 102 may function to execute program instructions from one or more modules where the program instructions are stored in a memory device such as memory 104 or storage device 106 or any other memory known to one of ordinary skill in the art. The CPU 102 may be configured to execute an application as contemplated by one or more embodiments of the present invention. The CPU 102 may be a general purpose microprocessor, a microcontroller, a digital signal processor, an application specific integrated circuit (ASIC), a field programmable gate array (FPGA), a programmable logic device, any type of programmable computer controller, a state machine, a gated logic, discrete hardware components, an artificial neural network, or any like suitable hardware known to one of ordinary skill in the art that can perform calculations of other manipulations of data according to the present invention. The information handling system 100 may also include an I/O interface 108 for sending and/or receiving inputs, such as inputs from a keyboard, a mouse, or a microphone. I/O interface 108 may also receive information such as multi-dimensional (for example, 3D) geophysical data, one or more values associated with one or more readings, settings, results, variables, feedback (or any other type of data known to one of ordinary skill in the art) from any one or more processes, systems, or external components including such information related to the liquefication of natural gas, or any other information known to one of ordinary skill in the art used in systems for model predictive control. For example, in certain embodiments, I/O interface 108 may receive a quality control, level, pressure, temperature or any other reading known to one of ordinary skill in the art from a component within the environment. Further, the information handling system 100 may include output means, such as a display 114 (for example, a liquid crystal display (LCD), a plasma display, or cathode ray tube (CRT) monitor). Display 114 comprises the necessary components to display any type of data necessary for any of the one or more embodiments of the present invention. For example, display 114 in combination with I/O interface 108 may provide a human to machine interface (HMI) for use in one or more embodiments of the present disclosure.

The information handling system 100 may be connected to a network 116 (for example, a local area network (LAN), a wide area network (WAN) such as the Internet, or any other similar type of network) via a network interface connection 110 to receive data from sensors, measurements, readings or any other data known to one of ordinary skill in the art as required by any one or more embodiments of the present invention. Those skilled in the art will appreciate that many different types of information handling systems exist, and the aforementioned input and output means may take other forms. Generally speaking, the information handling system 100 includes at least the minimal processing, input, and/or output devices, whether hardware, software or any combination thereof, necessary to practice embodiments of the invention.

The CPU 102 of information handling system 100 may also execute one or more applications 118. Application 118 may include one or more processors (not shown) where processor refers to a multivariable model-based predictive control (MPC) application designed to perform advanced process control (APC). A CPU, such as CPU 102, may execute instructions for many functions, including I/O communications, variable and measurement validation, estimation and prediction, steady-state optimization, and control move calculation associated with application 118. Application 118 may contain its own estimation function, but has parameters available for interface and collaboration with other processing units including CPU 102.

Any one or more processors associated with application 118 may also be associated with a model and version, which itself may contain a list of input and output variables, and may also include sub-systems, variable sets, economic functions, and tuning and other design and configuration version information. The lists of variables for application 118 and its model must be consistent (for example, when a variable is added or removed from the application 118, it is also automatically added or removed from the model). Variables in a model are classified as either model inputs or as model outputs. This classification is for modeling purposes only (for example, the mathematics of using measured inputs to produce estimates of process values) and does not necessarily structurally correspond to the physical arrangement of the process being modeled. A significant portion of the design process for application 118 involves selection of the input and output variables, and development of the model.

The operator or user should set the requested mode for the live application 118 to active to perform estimation or control. The operator or user may place the application 118 in standby when preparing for live mode, or when a short term intervention in the application's actions is required. The operating sets will remain in their current requested mode when the processor associated with application 118 is placed in standby. The operator or use with special permissions may place the processor associated with application 118 in inactive (or off) mode if it is desired to inactivate the application for a longer period; while in this mode, the processor associated with application 118 will not perform any calculations.

A user may be any operator, engineer, one or more information handling systems 100 or any other user known to one of ordinary skill in the art.

Further, those skilled in the art will appreciate that one or more components of the aforementioned information handling system 100 may be located at a remote location and connected to one or more other components over a network. Further, embodiments of the invention may be implemented on a distributed system having a plurality of nodes, where each portion of the invention may be located on a different node within the distributed system. For example, the display 114 may be located remotely from the other components of the information handling system 100. Information handling system 100 may comprise one or more client devices, servers, or any combination thereof.

Processor associated with application 118 operate using a model structure. The model structure provides the functionality required for estimation and control. The model structure is constructed using several components. For example, variables, single input/single output (SISO) relationships, transforms, and any other components known to one of ordinary skill in the art may be used to construct the model structure. An output variable that feeds other output variables is an intermediate variable.

The relationship between one input variable and one output variable may be described by a SISO relationship 202 as shown generally at 200 in FIG. 2. A SISO relationship 202 may contain one or more elements 204. An element 204 is a static or dynamic function describing the influence one input variable 206 has on one output variable 208. The present invention contemplates utilizing any type of model appropriate for a given system or process. In one embodiment, a finite impulse response (FIR) curve may be utilized for developing SISO relationships. In another embodiment, a parameter model may be utilized. Using a parameter model, an element may be one of the following functions: gain, gain delay, first order dynamic, second order dynamic, second order beta dynamic, zero gain second order dynamic, or any other appropriate function known to one of ordinary skill in the art. First and second order dynamics may include a ramping pole. Such functions may be expressed in the following manner:

Gain: $G(s)=Gain$

Gain Delay: $G(s)=Gain \cdot e^{-Delay \cdot s}$

Gain Delay Ramp: $G(s)=Gain \cdot e^{-Delay \cdot E}/s$

First Order: $G(s)=Gain \cdot e^{-Delay \cdot z}/\tau_1 \cdot s+1$

First Order Ramp: $G(s)=Gain \cdot e^{-Delay \cdot s}/(\tau_1 \cdot s+1) \cdot s$ Second Order: $G(s)=Gain \cdot e^{-Delay \cdot s}/\tau_2^{2,2}+\tau_1 \cdot s+1$ Second Order Ramp: $G(s)=Gain \cdot e^{-Delay \cdot s}/(\tau_s^2 \cdot s^2+\tau_1 \cdot s+1) \cdot s$ Second Order Beta: $G(s)=Gain \cdot (\beta \cdot s+1) \cdot e^{-Delay \cdot s}/\tau_2^2 \cdot s^2+\tau_1 \cdot s+1$ Second Order Beta Ramp: $G(s)=Gain \cdot (\beta \cdot s+1) \cdot e^{-Delay \cdot s}/(\tau_2^2 \cdot s^2+r_1 \cdot s+1) \cdot s$ Zero Gain Second Order: $G(s)=\beta \cdot s \cdot e^{-Delay \cdot s}/\tau_2^2 \cdot s^2+r_1 \cdot s+1$ A SISO relationship 202 associates one or more elements 204 to provide one or more functions between one input variable 206 and one output variable 208. Each element 204 describes only one static or dynamic function. Such a structure enables a controller or estimator to adapt its model based on predefined conditions, with or without operator intervention, as a generalization of gain scheduling to adapt not only the gain but the complete dynamic function. While only one SISO relationship 202 is shown, a system may include any number of SISO relationships 202.

As shown generally at 300 of FIG. 3, in certain embodiments a defined SISO relationship 302 may include zero, one, or more background elements 304 and one and only one active element 306. For example, when multiple element functionality is enabled, a background element 304 may be added to the SISO relationship 302. To adapt a process model, though, at least two background elements must be defined. Allowing SISO relationship 302 to include more than one element allows multiple behaviors for the same input/output variable pair which represents to some degree the nonlinearity in the process. The active element 306 contains the definition of the SISO relationship (depicted in FIG. 4 as element 402) that is actively used by the estimator or controller to predict the future of the output variable from changes in the input variable. All parameters of active element 306 may be modifiable. In certain embodiments these parameters include function type, gain, delay, first time constants (tau1 and tau2), and inverse zero (beta). While only one SISO relationship 302 is shown, a model predictive control system may include any number of SISO relationships 302 with any number of background elements 304.

As shown generally at 400 of FIG. 4, in certain embodiments a SISO relationship 402 must have at least one element and if only one element exists that element must be active element 306. That is, SISO relationship 402 may include zero background elements 304. While only one SISO relationship 302 is shown, a model predictive control system may include any number of SISO relationships 302 that include only one element, active element 306. A model predictive control system may include one or more SISO relationships 302, one or more SISO relationships 402 or any combination thereof.

Figure 5:
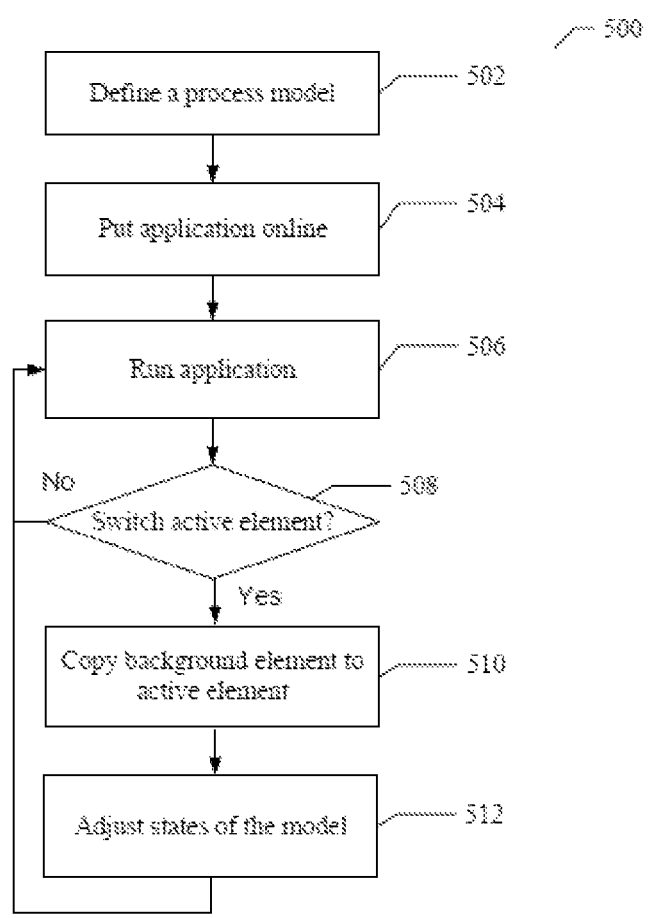
FIG. 5 is a flowchart illustrating background element switching according to one or more embodiments of the present disclosure.

Referring to FIG. 5, depicted generally at 500 is a flow diagram for background element switching for models in model predictive controllers according to one embodiment. At step 502 an application is defined with a model that contains one or more SISO relationships 302 that has a plurality of background elements 304. At step 504, application 118 is placed online. That is, the application can now be ran in real-time as the active application. At step 506, the application 118 runs for at least one cycle of estimation or control functionality using the associated model in step 502.

At step 508 it is determined whether the active element 306 should be switched with one of the associated background elements 304. This determination is based, at least in part, on external characterizations (for example feed type), operator intervention, mode change, input variable value, or any other condition known to one of ordinary skill in the art. In one embodiment, the determination is based, at least in part, on whether the process conditions have changed sufficiently, such that any one of the background elements 304 more closely represent how the output will change when the input changes than the current active element 306. For example, in one embodiment rules based on one or more SISO relationship input, output, or other auxiliary variables may enable switching based on external characterizations (for example feed type), operator intervention, mode change of input variable value and may be analyzed to determine that a given background element 304 better represents the process than the current active element 306.

The logic for switching elements may be based, at least in part, on the flowrate of a process stream. The range of the flowrate is broken into a plurality of contiguous segments. A background element 304 is associated with each of the plurality of contiguous segments. When the measured flowrate changes from one segment to another segment, the associated background element 304 is switched with the current active element 306. In another example, the switching logic may be based, at least in part, on a discrete input value, such as, the type of feed to a process unit, where a background element 304 is associated with each feed type.

If it is determined to switch the active element 306, then at step 510, the specified background element 304 as determined in step 508 is copied so as to replace the active element 306. That is, background element 304 becomes the new active element 306. That is, background element 304 is now the new active element 306.

At step 512, the internal states of the model are adjusted so that future predictions of the model for the output of the SISO relationship whose active element 306 was switched is approximately the same as the prediction before the switch was made. In this way, the introduction of an artificial disturbance or bump in the behavior of the estimator or controller is avoided. This new active element 306 is then used to predict the effect of new changes in the input variable on the respective output variable.

While the embodiments are described with references to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A method for background element switching in a model, comprising the steps of:
defining a process model for an application, wherein the process model comprises one or more single-input/single-output (SISO) relationships, and wherein the one or more SISO relationships comprise one or more background elements and an active element;
defining a range of a process variable, wherein the process variable is broken into a plurality of contiguous segments;
associating each of the background elements with a corresponding one of the plurality of contiguous segments;
placing the application online;
running the application;
determining whether to switch a selected background element with the active element, wherein the selected background element is one of the one or more background elements and wherein the determining step is based, at least in part, on changes in the process variable from one contiguous segment to another continuous segment;
copying the selected background element as a new active element, wherein the copying replaces the active element with the new active element; and
adjusting one or more states associated with the process model to transition to a new model.

2. The method of claim 1, wherein the determination step is based, at least in part, on one or more external characterizations, operator intervention, a mode change, and an input variable value.

3. The method of claim 1, wherein the determination step is based, at least in part, on whether process conditions have changed such that the selected background element provides a closer representation of the process model than the active element.

4. The method of claim 1, wherein the determination step is based, at least in part, on an external characterization of the process model, wherein the external characterization is associated with at least one of the one or more background elements.

5. The method of claim 1, wherein the process model is a finite impulse response model.

6. The method of claim 1, further comprising:
predicting, by utilizing the new active element, an effect of any one or more changes in an input variable on a respective output variable.

7. A system comprising:
one or more central processing units for processing information;
a memory communicatively coupled to the one or more central processing units; and
one or more modules that comprise instructions stored in the memory, the instructions, when executed by the one or more processing units, operable to perform operations comprising:
defining a process model for an application, wherein the process model comprises one or more single-input/single-output (SISO) relationships, and wherein the one or more SISO relationships comprise one or more background elements and an active element;
defining a range of a process variable, wherein the process variable is broken into a plurality of contiguous segments;
associating each of the background elements with a corresponding one of the plurality of contiguous segments;
placing the application online, wherein the application is based, at least in part, on the process model;
running the application;
determining whether to switch a selected background element with the active element, wherein the selected background element is one of the one or more background elements, and wherein the determining step is based, at least in part, on changes in the process variable from one contiguous segment to another continuous segment;
copying the selected background element as a new active element, wherein the copying replaces the active element with the new active element; and
adjusting one or more states associated with the process model to transition to a new model.

8. The system of claim 7, wherein the determination step is based, at least in part, on one or more external characterizations, operator intervention, mode change, and input variable value.

9. The system of claim 7, wherein the determination step is based, at least in part, on whether process conditions have changed such that the selected background element provides a closer representation of the process model than the active element.

10. The system of claim 7, wherein the determination step is based, at least in part, on an external characterization of the process model, wherein the external characterization is associated with at least one of the one or more background elements.

11. The system of claim 7, wherein the process model is a finite impulse response model.

12. The system of claim 7, further comprising:
predicting, by utilizing the new active element, an effect of any one or more changes in an input variable on a respective output variable.

13. The system of claim 7, wherein the application runs for at least one cycle of estimation or control functionality using the associated process model prior to the determination step.

* * * * *